Dec. 8, 1953  P. E. SIDLINGER  2,661,888
SAFETY BELT CONSTRUCTION
Filed Oct. 11, 1950  2 Sheets-Sheet 1
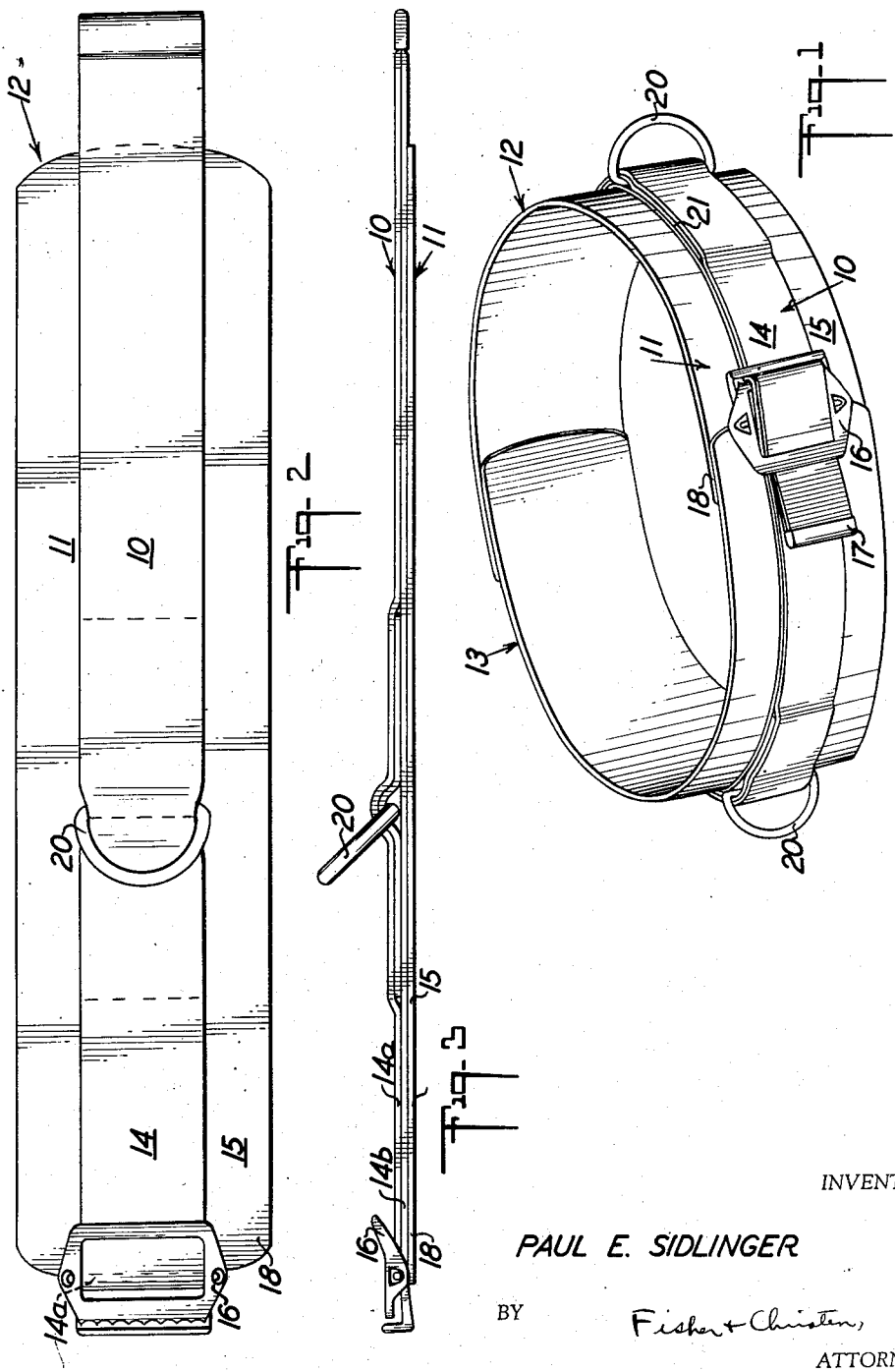
INVENTOR
PAUL E. SIDLINGER
BY Fisher + Christen,
ATTORNEYS Dec. 8, 1953     P. E. SIDLINGER     2,661,888
SAFETY BELT CONSTRUCTION
Filed Oct. 11, 1950     2 Sheets-Sheet 2
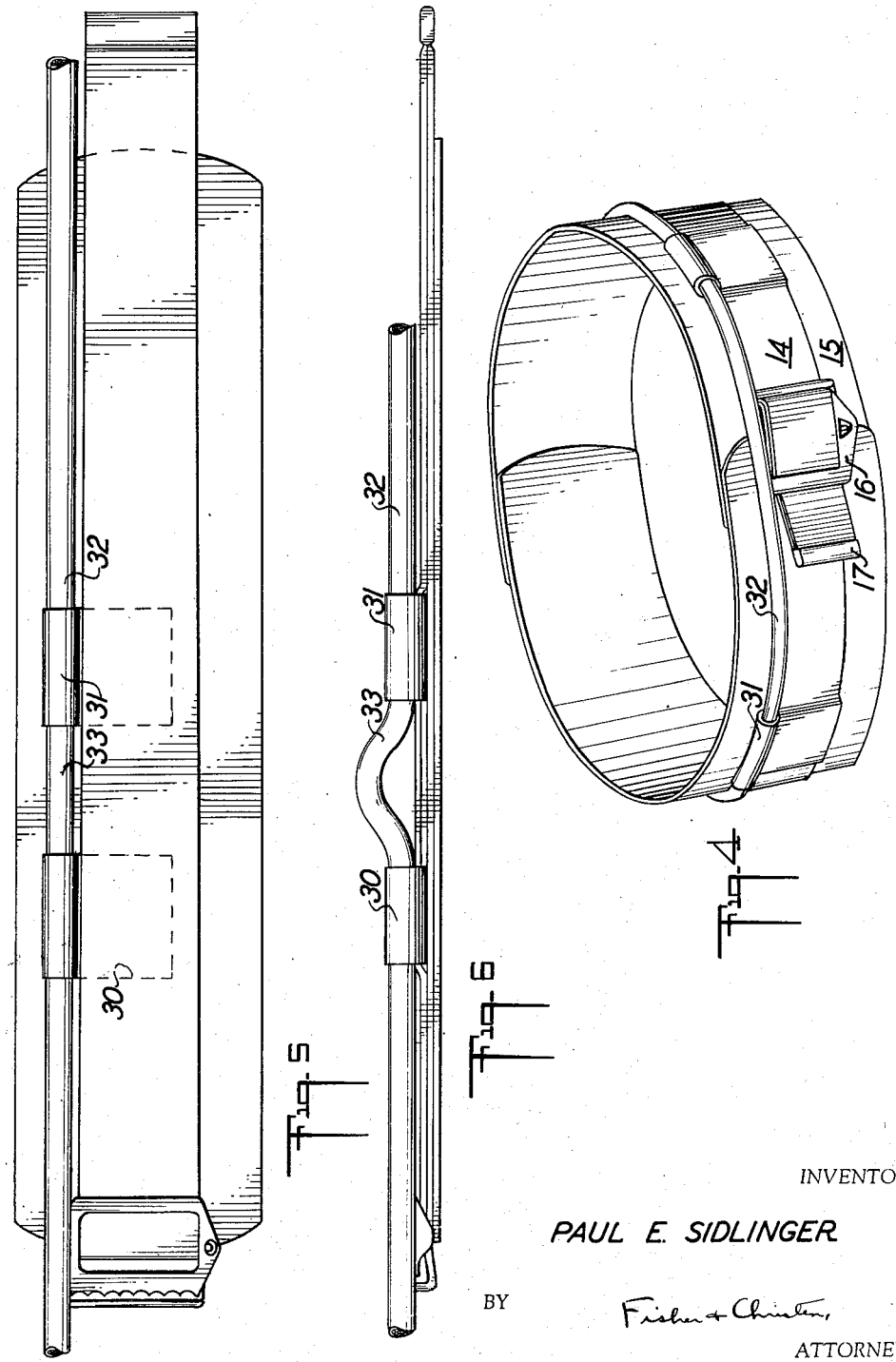
INVENTOR
PAUL E. SIDLINGER
BY
ATTORNEYS Patented Dec. 8, 1953

2,661,888

UNITED STATES PATENT OFFICE 2,661,888

SAFETY BELT CONSTRUCTION

Paul E. Sidlinger, Cedar Rapids, Iowa

Application October 11, 1950, Serial No. 189,608

1 Claim. (Cl. 227—49)

This invention relates generally to belt constructions and has particular relation to an adjustable safety belt construction which is particularly adapted for use in acrobatics and the like.

Prior safety belt constructions have the disadvantage that when they are adjusted to a particular wearer, the retaining means for attachment to conventional safety devices are thereby shifted so that the retaining means are not in a balancing position with respect to the wearer. Prior safety belts also have the disadvantage that they are of one piece, unitary construction which not only prevents balanced adjustment but also requires a cumbersome construction which is undesirable in safety belts.

One object of the invention is to provide an adjustable safety belt which may be snugly fitted on persons having varied waistlines.

Another object is to provide such a belt which carries fastening means and is so constructed that opposing fastening means may be positioned at the opposing sides of the wearer equidistantly from the front of the wearer at all adjustments of the belt.

Still another object is to provide such a belt wherein the fastening means will remain 180 degrees apart at all adjustments of the belt.

Still another object is to provide an adjustable safety belt provided with fastening means for slidably carrying an elastic and resilient ridge rope around the periphery of the belt so that the ridge rope may be attached to safety devices.

Still another object is to provide an adjustable safety belt which may be constructed in two identical sections.

Still another object is to provide such a safety belt construction which is simple in construction, inexpensive to manufacture and which offers a high safety factor to the user.

These and other objects of the invention will be better understood by reference to the following description and accompanying drawings:

In general, the present invention is directed to an adjustable safety belt comprising an outer belt portion and an inner belt portion, said outer belt portion comprising two belt sections of equal length, each section having a belt fastening means at one end and terminating in a tongue at the other end, the tongue of one section being fastened in the belt fastening means of the other section so that said fastening means are positioned 180 degrees apart on the waist of the user, said inner belt portion being of substantially greater width than said outer belt portion and comprising two sections of equal length, each inner section being attached coextensively to an outer belt section with its tongue end adjacent the outer belt tongue and free of the outer belt tongue, the tongue ends of the inner belt sections being overlapped, said assembled belt sections being provided with a plurality of fastening means for attachment thereto of a safety device, at least two opposing fastening means being equidistantly positioned from one of said belt fastening means so that said last fastening means may be positioned on a line perpendicular to the line defined by said belt fastening means at all adjustments of the belt on the wearer.

In its broader aspects, the invention is directed to such a belt construction wherein each of said assembled belt sections is provided approximately midway thereof with fastening means so that the fastening means will remain 180 degrees apart at all adjustments of the belt.

In one embodiment of the invention, the fastening means is in the form of members slidably carrying resilient elastic rope for attachment to a safety device. In a preferred form, the fastening members consist of loops which are positioned equidistantly from the center of each of the belt sections and these loops slidably carry an elastic, resilient ridge rope around the periphery of the belt assembly, the portions of the ridge rope between the loops being used as fastening loops for attachment to a conventional safety rig.

In a preferred embodiment, the fastening means are secured to the outer belt and this belt is preferably formed of a folded length with the retaining means secured between the folds of the outer belt. In actual use, D-rings and U-shaped strap members have been found to be the most practical and desirable retaining means. Also, in practice, ridge ropes formed of hundreds of individual strands of rubber encased in a braid have been found most successful. Also, conventional canvas belting has been found to be the most generally useful. Conventional buckles are preferred for the belt fastening means.

Referring now to the drawings:

Fig. 1 is a perspective view of a preferred form of safety belt embodying the present invention.

Fig. 2 is a side view of one of the belt sections shown in open, unassembled position.

Fig. 3 is a top view of the belt section shown in Fig. 2.

Fig. 4 is a perspective view of another preferred form of safety belt embodying the present invention.

Fig. 5 is a side view of one of the belt sections shown in Fig. 4 in open unassembled position with the ridge rope partially cut away, and Fig. 6 is a top view of the belt section shown in Fig. 5.

In the form shown in the drawings, the belt generally comprises an outer belt portion 10 and an inner belt portion 11. The belt assembly, as shown, is formed in two belt sections of equal length indicated generally at 12 and 13. Each belt section comprises an outer belt portion 14 and an inner belt portion 15, the latter having greater width than the former. The inner belt portion 15 is secured along a substantial portion of its length to the outer belt portion 14 as by means of stitching or gluing. The outer belt portion 14 is provided at one end with belt fastening means, as in the form of a buckle 16 and terminates at the other end in a tongue portion 17. The tongue end 18 of the inner belt portion 15 is adjacent the outer belt tongue 17 and free thereof so that the tongue ends 18 of the inner belt sections 15 may be overlapped in the assembled position of the safety belt and it will be apparent, as shown in Fig. 1, that the belt assembly is formed of two identical sections and that the tongue 17 of one outer belt section is secured in the buckle 16 of the other outer belt section so as to form an endless belt which is adjustable both at the front and back of the wearer. The inner belt portions 15 provide an enlarged friction surface for contacting the wearer and greatly reduce the binding effect of the belt assembly on the wearer. Also, the inner belt portions being overlapped at their tongue ends 18 eliminate direct contact of the buckles on the wearer.

It will be apparent that the belt fastening means, as the buckles 16, will be positioned 180 degrees apart on the wearer inasmuch as the belt sections are of equal length. At least one fastening means 20 is secured to each section of the belt. As shown in Fig. 1, the retaining means are in the form of D-rings for attachment to a safety rope or other conventional safety device, such as a safety rig (not shown). When two retaining loops 20 are used, as shown in Fig. 1, they are spaced midway between the buckles 16 so as to provide maximum equilibrium for the wearer. Thus, by adjusting the position of the tongues 17 in the buckles 16, the retaining loops 20 can always be positioned at the center of the sides of the wearer.

In the form shown, the D-rings 20 are secured by the outer belt sections 14. Preferably the outer belt section 14 is formed of an overlapping U-shaped strip, the center 14a of which passes around the buckle shaft to form outer belt portions 14a and 14b and the ends of the strip form the tongue 17. In this construction, the D-ring 20 is secured between the two outer belt sections 14a and 14b, additional strength being gained by the use of an insert strip 21 positioned between the D-ring and the outer belt portion 14b.

It will be apparent that more than two retaining loops 20 may be used and that equilibrium and balance may be obtained so long as the loops 20 are positioned geometrically; that is, to define the points of a triangle, square, rectnagle, pentagon, etc., and further so long as at least two of the opposing loops are equidistantly positioned from one of the belt buckles.

Referring now to the embodiment shown in Figs. 4–6, the construction of the belt is substantially identical to that shown in Figs. 1–3 with the exception of the fastening means or retaining loops for attachment to a conventional safety device. In this form, the fastening means are in the form of U-shaped strips 30 which are secured between the outer belt strips 14a and 14b.

The loop portions 31 are adapted to carry an elastic, resilient ridge rope 32. Preferably, a pair of loops 30 is secured equidistantly from the center portion of a belt section so as to provide centered retaining means for the section 33 of the ridge rope slidably positioned between the loops 30 and serving as an elastic retaining loop for attachment to a conventional safety device.

In the form shown, the ridge rope 32 is endless and passes around the periphery of the belt assembly. Being slidably mounted in the loops 30, the elastic ridge rope 32 will distribute the stress around the entire body of the wearer so as to improve the balance of the wearer during use of the device. In this form, the present belt has found particular use when attached to conventional gymnastic chair equipment and rigid safety rings conventionally used in acrobatic training. The U-shaped loop strips 30 may be formed of the same material as the outer belt portion 14.

It will be apparent that various conventional belt fastening means may be used instead of conventional buckles and that various retaining means other than conventional D-rings may be used for attachment to safety rigs. It will also be apparent that leather or plastic belting may be used in place of canvas belting. Thus, it will be apparent that various modifications may be made to the present invention without departing from the spirit and scope of the appended claim and it is intended that all such departures occurring to those skilled in the art be included within the appended claim.

I claim:

An adjustable safety belt comprising an outer belt portion and an inner belt portion, said outer belt portion comprising two belt sections of equal length, each section having a belt fastening means at one end and terminating in a tongue at the other end, the tongue of one section being fastened in the belt fastening means of the other section so that said fastening means are positioned 180 degrees apart on the waist of the user, said inner belt portion being of substantially greater width than said outer belt portion and comprising two sections of equal length, each inner section being attached coextensively to an outer belt section with one end adjacent the outer belt tongue and free thereof, each of said assembled belt sections being provided with anchoring means for attachment to a safety device, said anchoring means being positioned symmetrically relative to said fastening means whereby said anchoring means may be positioned symmetrically at all adjustments of the belt on the wearer.

PAUL E. SIDLINGER.

References Cited in the file of this patent

UNITED STATES PATENTS

| Number | Name | Date |
|--------|------|------|
| 148,744 | Parent | Mar. 17, 1874 |
| 630,045 | Gaisman | Aug. 1, 1899 |
| 843,478 | Muller | Feb. 5, 1907 |
| 1,508,892 | Mikalsen | Sept. 16, 1924 |
| 2,130,724 | Lewis | Sept. 20, 1938 |

FOREIGN PATENTS

| Number | Country | Date |
|--------|---------|------|
| 124,218 | Germany | Nov. 28, 1900 |
| 649,082 | France | Aug. 21, 1928 |
| 699,522 | France | Dec. 16, 1930 |